US005544730A

United States Patent [19]

Adrian et al.

[11] Patent Number: 5,544,730

[45] Date of Patent: Aug. 13, 1996

[54] TENSION RELEASE FOR PASSENGER CONVEYOR

[75] Inventors: Willy Adrian, Obernkirchen; Klaus Bruehl, Hanover, both of Germany

[73] Assignee: Otis Elevator Company, Farmington, Conn.

[21] Appl. No.: 204,109

[22] Filed: Mar. 1, 1994

[51] Int. Cl.$^6$ .......... B65G 43/00

[52] U.S. Cl. .......... 198/336

[58] Field of Search .......... 118/329, 336, 118/814, 816

[56] References Cited

U.S. PATENT DOCUMENTS

| | | | |
|---|---|---|---|
| 2,649,181 | 8/1953 | Hansen | 198/329 |
| 3,170,557 | 2/1965 | Takenaga et al. | 198/336 X |
| 3,749,224 | 7/1973 | Engelet | 198/336 X |
| 4,564,099 | 1/1986 | Uozumi | 198/336 X |
| 5,295,567 | 3/1994 | Zaharia et al. | 198/323 |

FOREIGN PATENT DOCUMENTS

| | | | |
|---|---|---|---|
| 0102774 | 8/1979 | Japan | 198/336 |
| 1127831 | 12/1984 | U.S.S.R. | 198/336 |
| 1474065 | 4/1989 | U.S.S.R. | 198/336 |
| 1112718 | 5/1968 | United Kingdom | 198/336 |

*Primary Examiner*—James R. Bidwell

[57] ABSTRACT

The tension on the moving handrail drive and/or step chain of a passenger conveyor such as an escalator or moving walkway is automatically released when the conveyor is shut down; and is automatically reapplied when the conveyor is started up again. Undesirable compression and localized flattening of the elastomeric components of the conveyor are thus avoided.

9 Claims, 6 Drawing Sheets

TENSION RELEASE FOR PASSENGER CONVEYOR

TECHNICAL FIELD

This invention relates to a passenger conveyor having tension release mechanisms for automatically releasing step chain and/or handrail drive tension when the conveyor is shut down for extended periods of time, such as overnight, or after factory assembly but before installation.

BACKGROUND ART

Passenger conveyors such as escalators and moving walkways are provided with constantly tensioned components which are designed to ensure proper operation despite stretching thereof which will occur over extended periods of time. Examples of such tensioned components are the step chain, and the handrail drive. The step chains are reeved over sprockets which are positioned beneath each of the conveyor landings. One of the sprocket sets is connected to the drive motor and provides the drive power for moving the step chains and steps. This powered sprocket set is usually located at the upper landing in an escalator. The other sprocket set is an idler sprocket which simply reverses the direction of movement of the step chains and steps. The idler sprocket is typically mounted on a carriage which is translationally movable relative to the step chain, which carriage serves as a step chain tensioning carriage. The carriage is biased by springs so as to apply a continuous tension to the step chain loops. Thus, as the step chains stretch after time, the tension imparted to them will not diminish and the step chains will not slacken. Since the step chain tension is constant, due to the use of the springs, the chains will remain under tension even when the conveyor is not in operation, as for example, during overnight periods, and between factory assembly and installation of the escalator, or walkway in the field. The maintenance of step chain tension during extended periods of non-use is not desirable. The step chain rollers and the step trailer rollers are formed with elastomeric rolling surfaces which reduce vibration and noise during conveyor operation. When the conveyor is shut down for extended periods of time, the elastomeric surfaces of the step rollers will develop localized flat spots on them where the rollers are pressed against the guide tracks. These flat spots will cause operating noise and vibration, and thus are undesirable. The conveyor step chain can be de-tensioned between assembly and installation, but there is no presently available equipment for de-tensioning the step chain during temporary, but relatively extended non-operating periods; and there is no presently available equipment for automatically retensioning the step chain when the escalator is to be put into service.

In addition to the step chain, the handrail drive assembly is another component of the conveyor that would benefit from detensioning during extended periods of non-operation. Escalator and moving walkway handrails are moved over guide tracks by a drive system which exerts a compressive force on the handrail. The handrail-engaging portion of the drive system may include elastomeric rollers which engage the handrail; or a drive belt that engages the handrail. The driving portion will be pretensioned so as to apply a predetermined pressure to the handrail. When the conveyor is shut down for extended periods of time, as noted above, the drive member may develop flat spots, and the area of the handrail contacted by the drive member will also develop localized flat spots or indentations. As noted above, the localized flat spots or depressions in the drive system or handrail will result in noise generation and uneven operation. The aforesaid problems with passenger conveyor operation can be curtailed if the tensioned drive components are detensioned or relaxed during non-operating periods of time, or "down time."

DISCLOSURE OF THE INVENTION

This invention relates to a tension control system for automatically relaxing the tension on pretensioned components of an escalator or moving walkway when the conveyor is turned off; and for re-tensioning such components when the conveyor is turned back on again. The tension control system of this invention is operably connected to the main power supply for the conveyor. The tension control system preferably includes a reversible electric motor which drives a rotary actuator that can selectively compress or relax the pretensioning spring, in the tensioning assembly so as to compress or expand the pretensioning spring, as required, to release or apply the pretension force. In systems which apply the pretension force by spring expansion, the motor will compress the pretensioning spring when the conveyor is shut off, and will allow the pretensioning spring to expand when the conveyor is turned back on. In systems where the pretension force is applied by spring compression, the motor will expand the pretension spring when the power is turned off; and will recompress the pretension spring when the power is turned back on.

It is therefore an object of this invention to provide a passenger conveyor having provisions for automatically relaxing tension on pretensioned operating assemblies when the conveyor is turned off.

It is an additional object of the invention to provide a passenger conveyor of the character described wherein the operating assemblies are automatically retensioned when power is restored to the conveyor.

It is a further object of this invention to provide a passenger conveyor of the character described wherein the tension adjustment is provided by a reversible electric motor which is operated by the main power supply to the conveyor.

These and other objects and advantages of the invention will become more readily apparent from the following detailed description of several embodiments of the invention, when taken in conjunction with the accompanying drawings, in which:

BEST MODE FOR CARRYING OUT THE INVENTION

Figure 1:
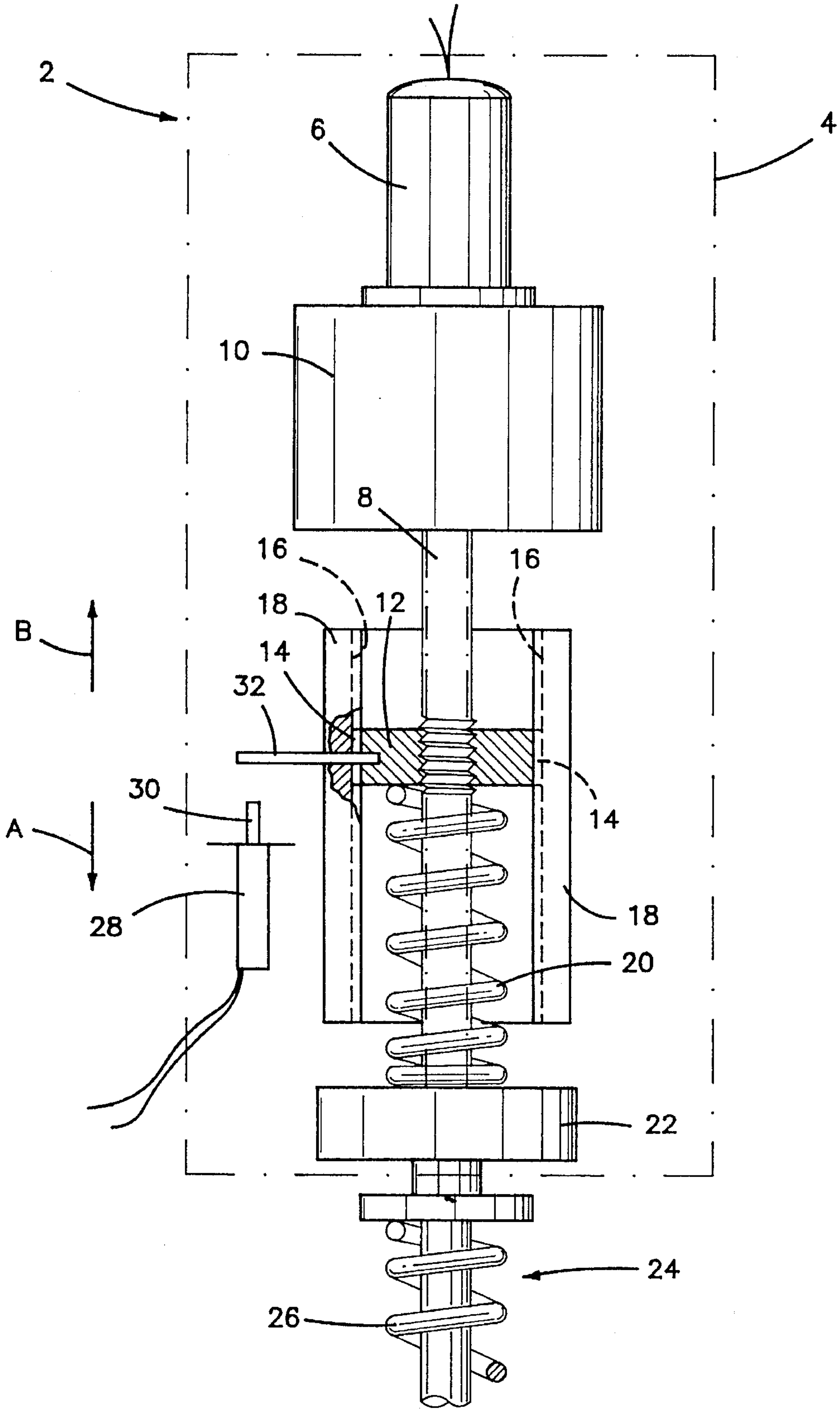
FIG. 1 is a somewhat schematic side elevational view, partially in section, of a tension release assembly designed for use in conjunction with pretension assemblies in an escalator or moving walkway.

Referring now to FIG. 1, there is shown an embodiment of a tension release assembly which is denoted generally by the numeral 2, and will preferably be contained in a housing 4 (shown in phantom) in order to protect the working parts of the assembly from debris which may be found in the internal areas of an escalator or moving walkway. The assembly 2 includes a reversible electric motor 6 which is selectively operable to rotate a threaded rod 8 via a gear reduction connection 10. A threaded nut 12 is mounted on the rod 8 and includes lateral splines 14 which are slidably disposed in axial grooves 16 in fixed gibs 18. Thus, as the rod 8 is rotated by the motor 6, the nut 12 will slide up or down along the gibs 18, depending on the direction of rotation of the rod 8. The nut 12 bears against a spring 20 which is mounted on and aligned with the rod 8. The spring 20 bears against, and may be connected to a pusher plate 22. The pusher plate 22 bears against a spring-biased member 24 of the tensioned component of the escalator, be it handrail drive, step chain, or what have you. As previously noted, the nut 12 can move in the direction of the arrow A to cause the plate 22 to compress the spring 26 in the spring-biased member 24; or it can move in the direction of the arrow B to allow the spring 26 to expand, all depending on which direction the motor 6 rotates the rod 8.

Assuming that when the spring 26 is expanded, tension will be applied to the pretensioned escalator component, then if the nut 12 is moved in the direction of the arrow A, the spring 26 will be compressed, and the tension on the escalator component will be released. A fixed limit switch 28 with a spring biased plunger 30 may be included for contact with an actuator 32 on the nut 12 so that pressure releasing current to the motor 6 will be interrupted when the nut 12 reaches a predetermined location. A similar limit switch could be positioned on the other side of the actuator 32 for engagement by the latter when the nut 12 moves in the direction of the arrow B. If the spring 26 were to create escalator component tension by being compressed, then the nut 12 will be moved in the direction of the arrow B in order to release the tension on the escalator component.

The system operates as follows. Any time the main power switch to the escalator is turned on, the motor 6 is caused to rotate the rod 8 to adjust the spring 26 in such a fashion as to apply the proper tension to the tensioned component of the escalator. When the proper position of the nut 12 is reached, the motor 6 is deenergized. When the main power switch to the escalator is turned off, the motor 6 is momentarily energized in the reverse direction and the nut 12 is returned to its initial position to release the tension on the escalator component.

Figure 2:
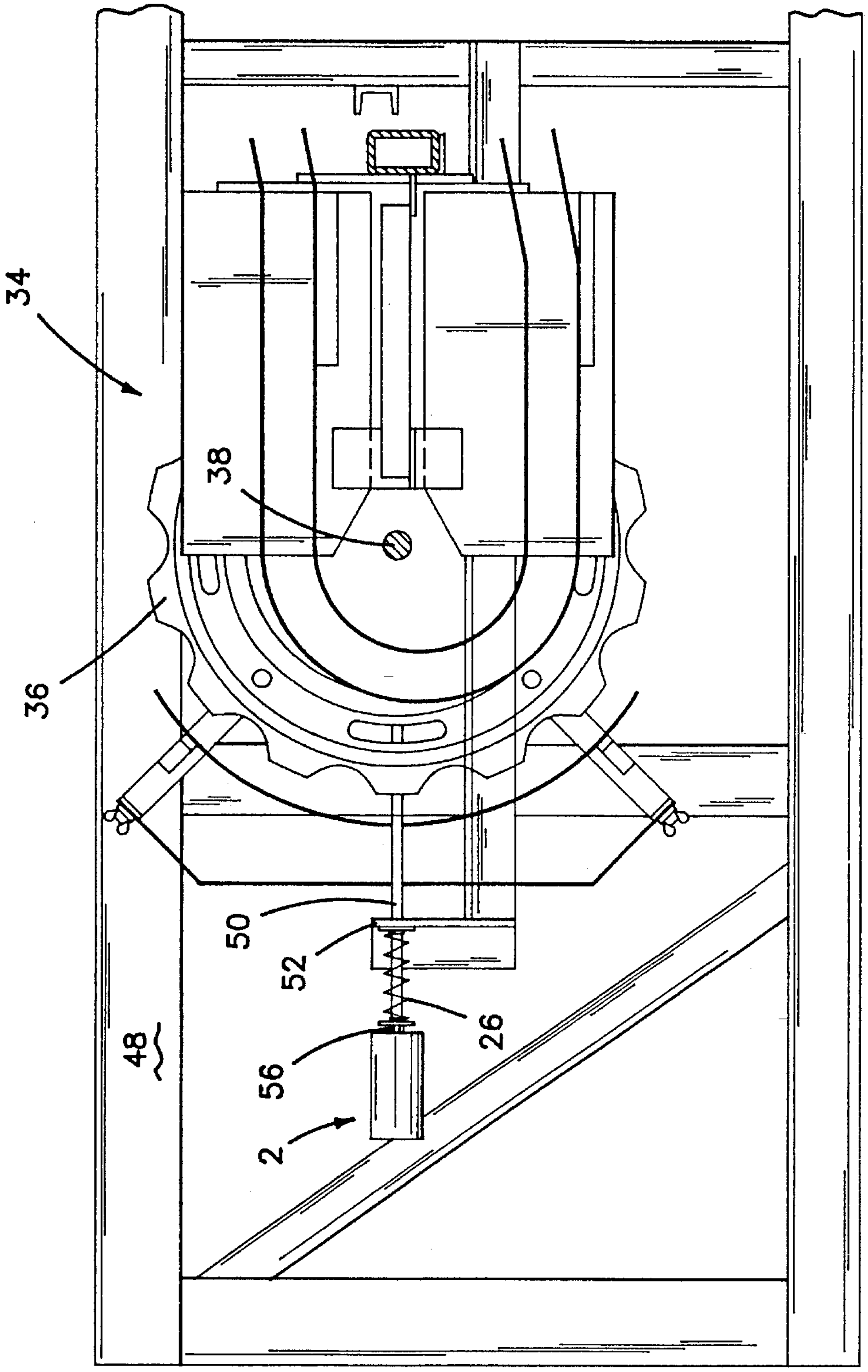
FIG. 2 is a side elevational view partly in section of the idler sprocket assembly for the step chain of an escalator.
Figure 3:
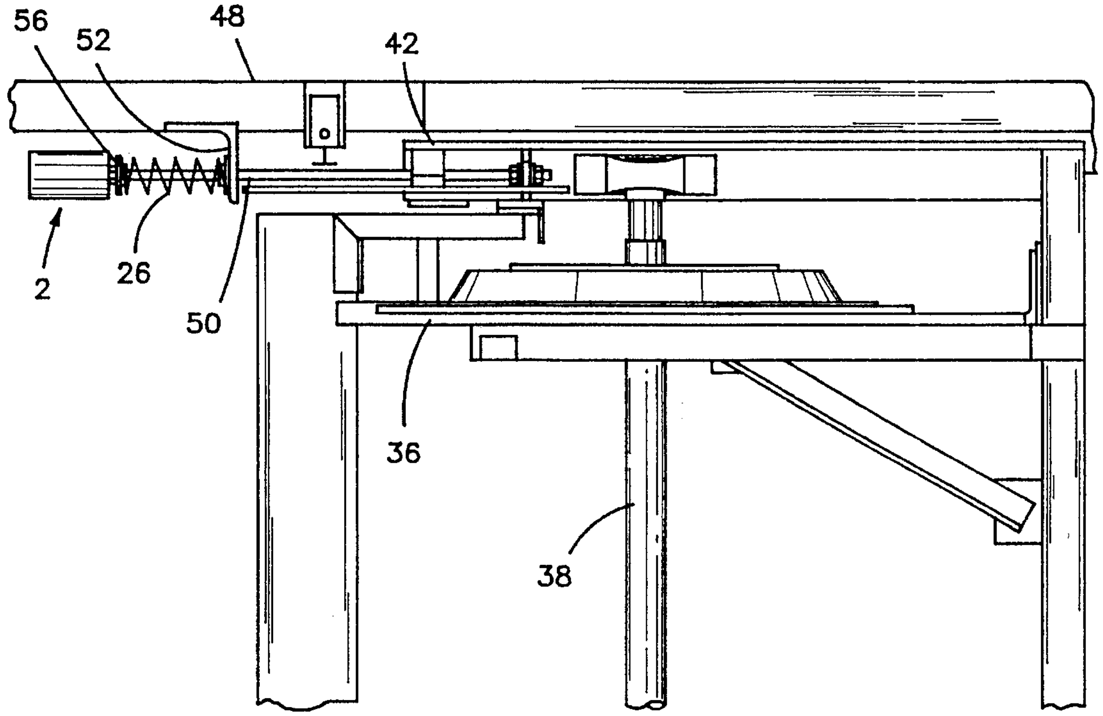
FIG. 3 is a fragmented top plan view of the idler sprocket assembly.
Figure 4:
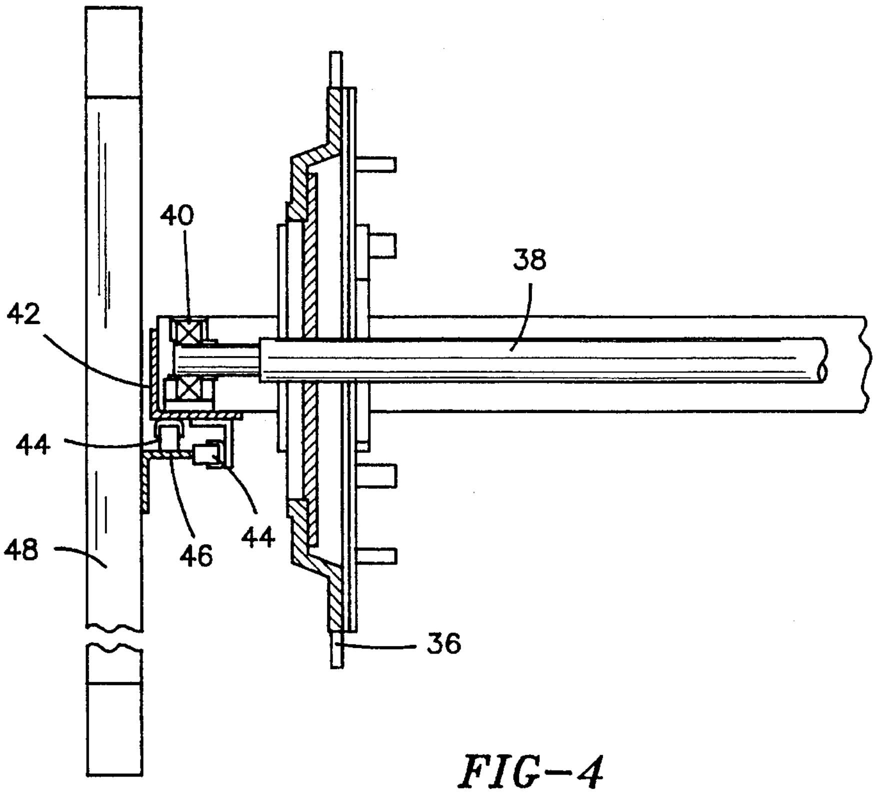
FIG. 4 is a fragmented end elevational view of the idler sprocket assembly.

Referring to FIGS. 2–4, the idler sprocket assembly 34 of the escalator is shown. This portion of the escalator includes a pair of sprockets 36 on which the step chains (not shown) are reeved. The sprockets 36 are fixed to a shaft 38 which is journaled in bearings 40 mounted on angle brackets 42. The brackets 42 have rollers 44 secured thereto which ride forward or backward on rails 46 secured to the escalator truss 48. Rods 50 are secured to the brackets 42 and extend through guides 52 which are secured to the truss 48. Springs 26 are sandwiched between the guides 52 and washers 56 mounted on the rods 50. The springs 26 are operable to bias the rods 50 and thus the sprockets 36 to the left as viewed in FIGS. 2 and 3 thereby applying tension to the step chains. The tension release assemblies 2 described above are mounted on the truss 48 and act on the rods 50 so as to relieve the step chain tension when the escalator is turned off by compressing the springs 26.

Figure 5:
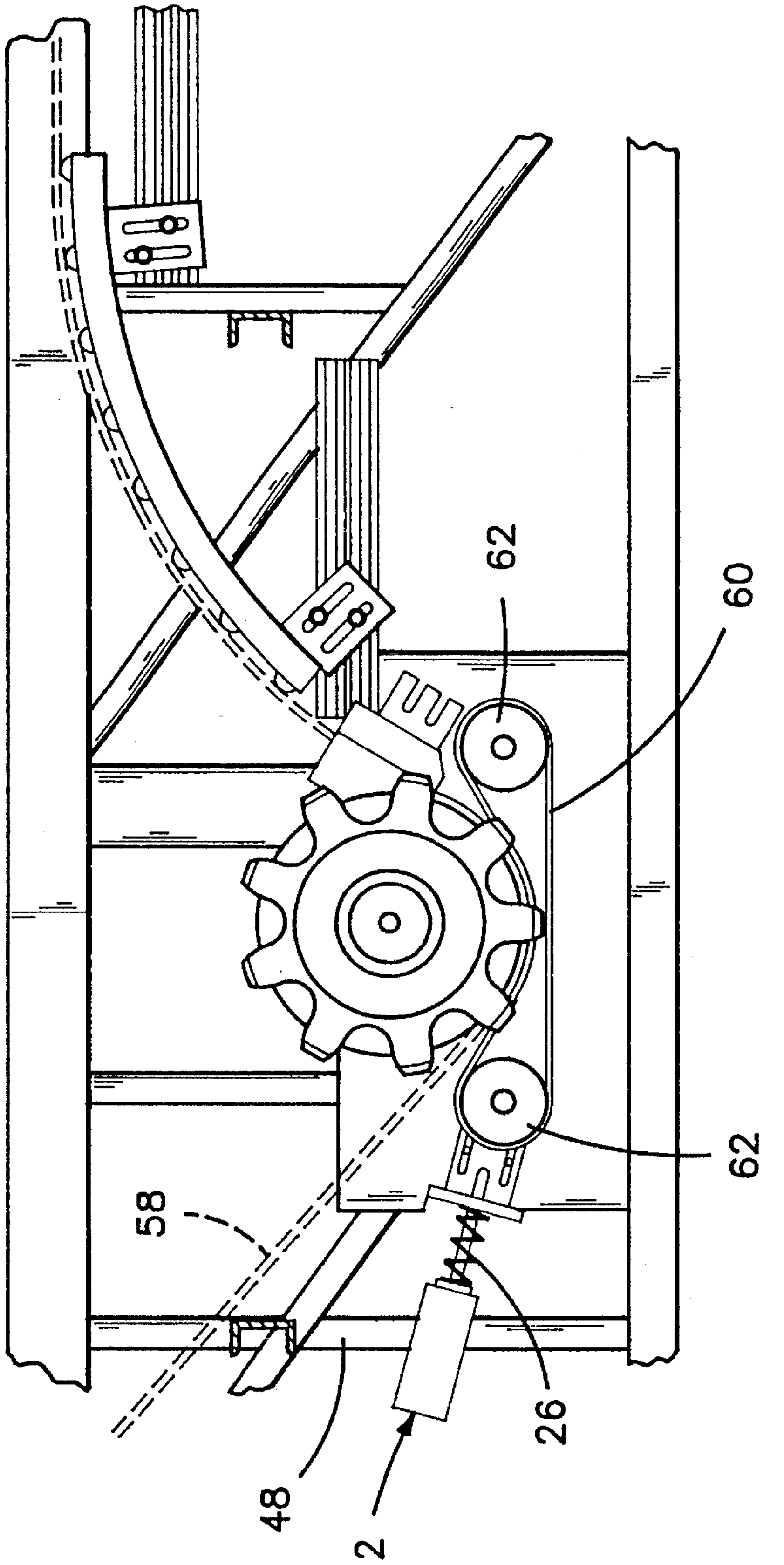
FIGS. 5–7 are side elevational views of various embodiments of handrail drive assemblies which can be detensioned and retensioned by the tension release of this invention.
Figure 6:
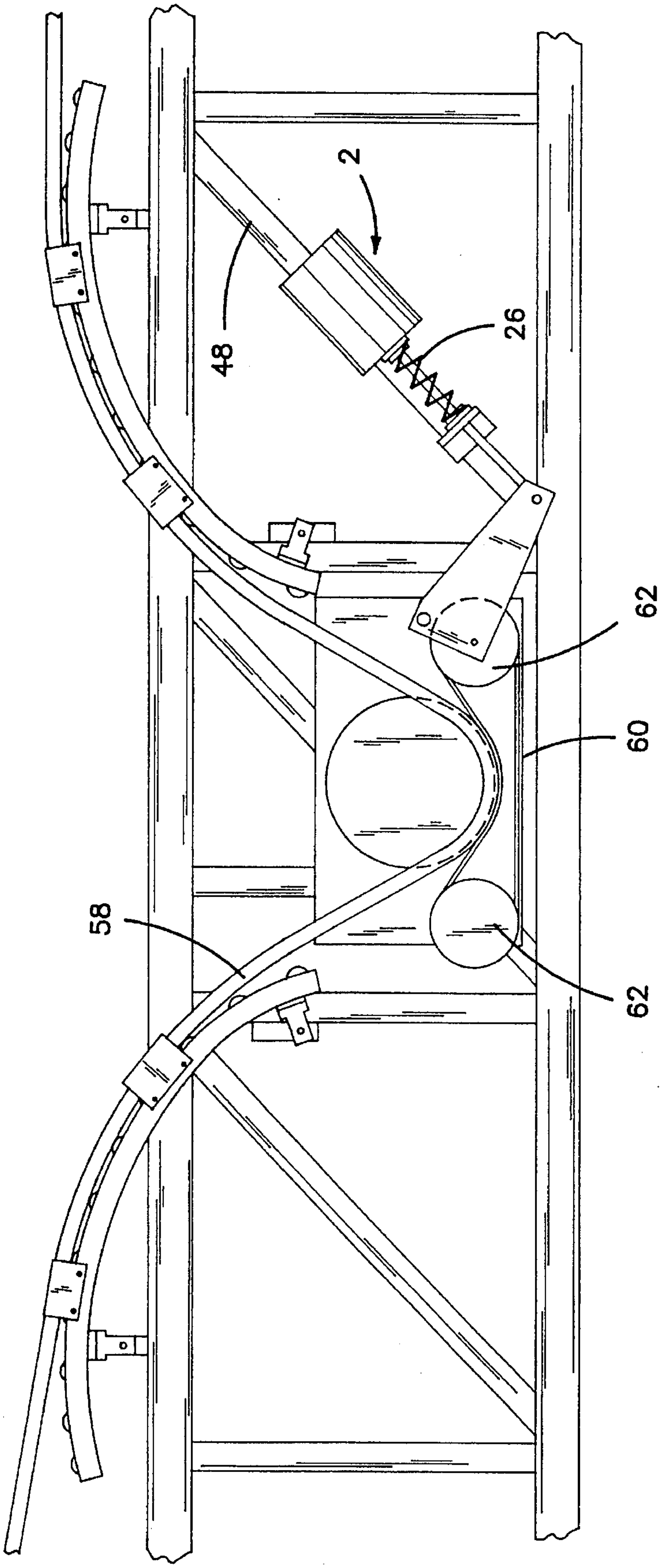

Referring to FIGS. 5 and 6, two somewhat similar handrail drive assemblies are shown. In both cases the handrail 58 is driven by engagement with a tensioned drive belt 60 which is looped around a pair of rollers 62. One of the rollers 62 is biased by a tensioning spring 26 so as to apply tension to the drive belt 60. The tension release assembly 2 is mounted on the escalator truss 48 and is operable to compress the spring 26 when the escalator is turned off, as previously described.

Figure 7:
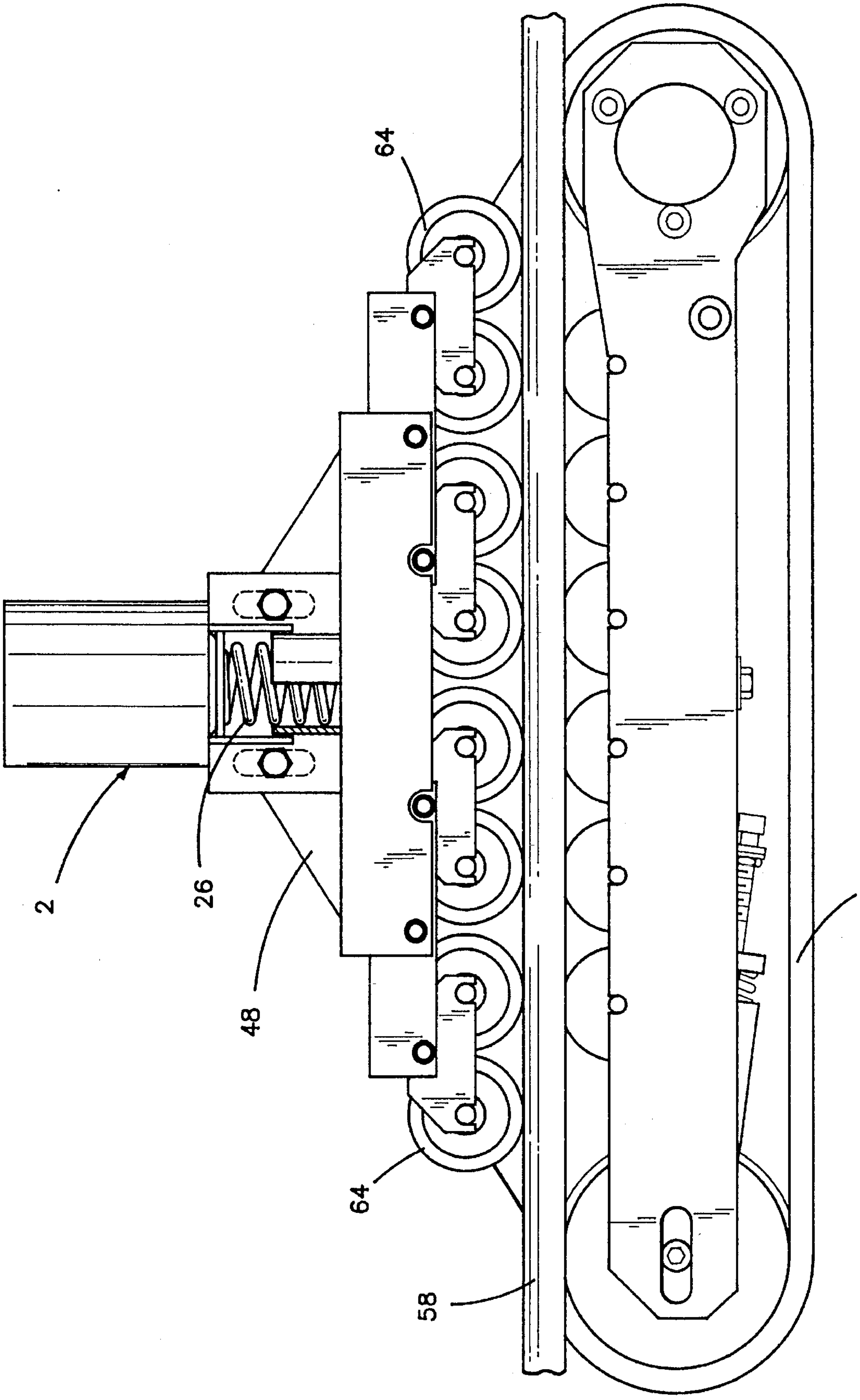

FIG. 7 shows another type of handrail drive assembly wherein the handrail 58 passes between a powered belt 60 and a plurality of pressure rollers 64 which are pressed against the handrail 58 by a spring 26. The tension release assembly 2 is mounted on the escalator truss 48 and is operable to relax the spring 26 when the escalator is turned off, as described above. The pressure exerted on the handrail 58 by the rollers 64 is thus relieved during extended periods when the escalator is not in use.

It will be readily appreciated that the tension release assembly of this invention is operable to relax operating pressure which is applied to various elastomeric members of the escalator, such as step chain rollers; the handrail; and elastomeric parts of the handrail drive, during extended periods of time when the escalator is not in use. This prevents localized flat spots or depressions from being formed on the elastomeric members, which would otherwise form if operating pressures were maintained during extended periods of inoperation. The result is smoother, quieter escalator or walkway operation, and extended component life.

Since many changes and variations of the disclosed embodiments of the invention may be made without departing from the inventive concept, it is not intended to limit the invention otherwise than as required by the appended claims.

What is claimed is:

1. An escalator or moving walkway passenger conveyor comprising:

a) a handrail;

b) a handrail drive assembly including first spring means which applies a compressive force to the handrail;

c) a step chain assembly including a step chain and a step chain sprocket; and second spring means operably connected to said sprocket for applying tension to said step chain; and d) first detensioning means connected to said first spring means and operable to disable the latter from applying said compressive force to the handrail during periods of time when motive power to the conveyor is interrupted.

2. The passenger conveyor of claim 1 further comprising second detensioning means connected to said second spring means and operable to disable the latter from applying tension to said step chain during periods of time when motive power to the conveyor is interrupted.

3. An escalator or moving walkway passenger conveyor comprising:

a) a handrail;

b) a handrail drive assembly including first spring means which applies a compressive force to the handrail;

c) a step chain assembly including a step chain and a step chain sprocket; and second spring means operably connected to said sprocket for applying tension to said step chain; and d) detensioning means connected to one of said first and second spring means and operable to disable said one of said spring means from performing its stated function during periods of time when motive power to the conveyor is interrupted.

4. The passenger conveyor of claim 3 wherein said detensioning means comprises a reversible electric motor; a threaded rod operably connected to said motor and rotatable in opposite directions by said motor; reciprocating means mounted on said rod and movable in opposite directions over said rod in response to rotation of said rod, said reciprocating means engaging said one of said spring means to selectively compress or relax said one of said spring means when motive power to the conveyor is turned off or on so that said one of said spring means is selectively disabled and enabled to perform its stated function during periods of non-operation and operation of the conveyor respectively.

5. The passenger conveyor of claim 4 wherein said reciprocating means includes a coil spring member operable to engage said one of said spring means.

6. The passenger conveyor of claim 4 further comprising switch means operable to control operation of said reversible electric motor to limit the degree of rotation of said rod in at least one direction.

7. A method for operating a moving passenger conveyor which conveyor includes a moving handrail and a moving step chain, said method comprising the steps of:

a) compressing a moving elastomeric component of said conveyor against another component of the conveyor during periods of passenger-conveying operation of the conveyor; and b) decompressing said elastomeric component during periods of non-operation of said conveyor so as to prevent localized deformation of said elastomeric component when motion of the conveyor ceases during said periods of non-operation.

8. The method of claim 7 wherein said elastomeric component is a step roller and said other component is a track over which said step roller moves, and wherein said compressing step comprising the application of tension to a conveyor step chain so as to press the step roller against the track during periods of operation of the conveyor.

9. The method of claim 7 wherein said elastomeric component is the handrail, and said other component is a handrail drive assembly in the conveyor, and wherein said compressing step comprises the application of tension to the handrail drive assembly.

* * * * *